United States Patent
Ouchi et al.

(10) Patent No.: US 12,077,467 B2
(45) Date of Patent: Sep. 3, 2024

(54) MEMBER WITH POROUS LAYER AND COATING LIQUID FOR FORMING POROUS LAYER

(71) Applicant: CANON KABUSHIKI KAISHA, Tokyo (JP)

(72) Inventors: Shun Ouchi, Kanagawa (JP); Shuhei Yamamoto, Tokyo (JP); Tomonari Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 17/477,034

(22) Filed: Sep. 16, 2021

(65) Prior Publication Data

US 2022/0098093 A1  Mar. 31, 2022

(30) Foreign Application Priority Data

Sep. 25, 2020 (JP) .................................. 2020-161434
Jul. 30, 2021 (JP) .................................. 2021-125004

(51) Int. Cl.
*C03C 14/00* (2006.01)
*C03C 11/00* (2006.01)
(Continued)

(52) U.S. Cl.
CPC .......... *C03C 14/004* (2013.01); *C03C 11/002* (2013.01); *C03C 17/007* (2013.01); *C03C 17/02* (2013.01); *C03C 17/3411* (2013.01); *C03C 17/42* (2013.01); *G02B 1/113* (2013.01); *C03C 2217/425* (2013.01); *C03C 2217/452* (2013.01); *C03C 2217/465* (2013.01); *C03C 2217/478* (2013.01); *C03C 2217/732* (2013.01); *C03C 2217/734* (2013.01); *C03C 2217/76* (2013.01);
(Continued)

(58) Field of Classification Search
CPC ... C03C 14/004; C03C 11/002; C03C 17/007; C03C 17/02; C03C 17/3411; C03C 17/42; G02B 1/113
See application file for complete search history.

(56) References Cited

U.S. PATENT DOCUMENTS

| 5,013,788 A | 5/1991 | Nagashima et al. |
| 9,145,473 B2 * | 9/2015 | Nakayama ......... C08G 73/1028 |

(Continued)

FOREIGN PATENT DOCUMENTS

| CN | 102119203 A | 7/2011 |
| CN | 110225949 A | 9/2019 |

(Continued)

OTHER PUBLICATIONS

Web, Snowtex, Nissan Chemical America Corporation, https://nissanchem-usa.com/products/snowtex/, Accessed Jan. 30, 2022.

(Continued)

*Primary Examiner* — Bao-Luan Q Le
(74) *Attorney, Agent, or Firm* — Canon U.S.A., Inc. IP Division

(57) ABSTRACT

The present disclosure provides a member having a porous layer containing particles and having a low refractive index and high film strength and a coating liquid for forming a porous layer containing particles, wherein the porous layer contains a plurality of silicon oxide particles bound by an inorganic binder and at least one acid.

34 Claims, 5 Drawing Sheets

(51) Int. Cl.
*C03C 17/00* (2006.01)
*C03C 17/02* (2006.01)
*C03C 17/34* (2006.01)
*C03C 17/42* (2006.01)
*G02B 1/113* (2015.01)

(52) U.S. Cl.
CPC .. *C03C 2218/113* (2013.01); *C03C 2218/116* (2013.01); *C03C 2218/32* (2013.01)

(56) References Cited

U.S. PATENT DOCUMENTS

| | | | |
|---|---|---|---|
| 10,564,321 B2* | 2/2020 | Nakayama | G02B 1/11 |
| 10,738,197 B2* | 8/2020 | Nakayama | B05D 1/18 |
| 2009/0075092 A1 | 3/2009 | Varaprasad | |
| 2012/0314294 A1* | 12/2012 | Nakayama | B05D 5/063 |
| | | | 528/26 |
| 2013/0273317 A1* | 10/2013 | Nakayama | C08G 73/1046 |
| | | | 428/141 |
| 2016/0170094 A1* | 6/2016 | Nakayama | G02B 1/11 |
| | | | 428/149 |
| 2017/0073524 A1* | 3/2017 | Nakayama | C09D 1/00 |
| 2017/0176644 A1* | 6/2017 | Nakayama | B32B 27/20 |
| 2020/0056053 A1 | 2/2020 | Takachi | |

FOREIGN PATENT DOCUMENTS

| | | |
|---|---|---|
| EP | 2734871 A1 | 5/2014 |
| EP | 3663809 A1 | 6/2020 |
| JP | H02175732 A | 7/1990 |
| JP | 2007078711 A | 3/2007 |
| JP | 2015049319 A | 3/2015 |
| JP | 2015162394 A | 9/2015 |
| JP | 2019143103 A | 8/2019 |
| JP | 2020007382 A | 1/2020 |

OTHER PUBLICATIONS

Amino tris (methylene phosphonic acid), internet, Chemical Book, https://www.chemicalbook.com/ChemicalProductProperty_EN_CB3451342.htm, accessed Jun. 23, 2022.

* cited by examiner

MEMBER WITH POROUS LAYER AND COATING LIQUID FOR FORMING POROUS LAYER

BACKGROUND

Field of the Disclosure

The present disclosure relates to a member having a porous layer containing particles and a coating liquid for forming a porous layer containing particles.

Description of the Related Art

In a known low-refractive-index film, hollow or chainlike silicon oxide particles are used to form an empty space in the film and to contain air (refractive index 1.0), thereby decreasing the refractive index to 1.3 or less. A technique of applying/drying a dispersion liquid of silicon oxide particles is widely used to form a low-refractive-index film having an empty space therein. Such a low-refractive-index film is suitably used as a layer constituting an antireflection film.

In a low-refractive-index film containing silicon oxide particles, an excessively high ratio of an empty space in the film results in low film strength, wear resistance, and scratch resistance. To solve this problem, in Japanese Patent Laid-Open No. 2007-78711, hollow silicon oxide particles and fine silicon oxide solid particles are mixed to form a film with increased strength.

However, a film described in Japanese Patent Laid-Open No. 2007-78711 has a smaller empty space due to the fine silicon oxide particles and therefore has an increased refractive index. Thus, the increase in film strength is accompanied by the increase in refractive index and degradation of the performance of the low-refractive-index film.

SUMMARY

In view of such problems, the present disclosure provides a member having a porous layer containing particles and having a low refractive index and high film strength and a coating liquid for forming a porous layer containing particles.

A member according to the present disclosure is a member having a porous layer on a substrate, wherein the porous layer contains a plurality of silicon oxide particles bound by an inorganic binder and at least one acid selected from the group consisting of the following formulae (1) to (4).

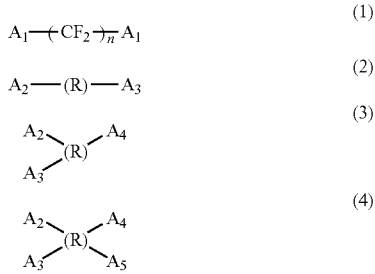

$A_1$ in the formula (1) denotes COOH, and n denotes an integer in the range of 2 to 8, one of $A_2$ and $A_3$ in the formula (2) denotes $SO_3H$ or $PO_3H_2$, and the other denotes an acidic group selected from the group consisting of $SO_3H$, $PO_3H_2$, COOH, and OH, and R denotes a divalent organic group having 1 to 20 carbon atoms, at least one of $A_2$, $A_3$, and $A_4$ in the formula (3) denotes $SO_3H$ or $PO_3H_2$, and the other denotes an acidic group selected from the group consisting of $SO_3H$, $PO_3H_2$, COOH, and OH, and R denotes a trivalent organic group having 1 to 20 carbon atoms, and at least one of $A_2$, $A_3$, $A_4$, and $A_5$ in the formula (4) denotes $SO_3H$ or $PO_3H_2$, and the other denotes an acidic group selected from the group consisting of $SO_3H$, $PO_3H_2$, COOH, and OH, and R denotes a tetravalent organic group having 1 to 20 carbon atoms.

A coating liquid according to the present disclosure contains silicon oxide particles, a component serving as an inorganic binder, an organic solvent, and at least one acid selected from the group consisting of the following formulae (1) to (4).

 (1)

 (2)

 (3)

 (4)

$A_1$ in the formula (1) denotes COOH, and n denotes an integer in the range of 2 to 8, one of $A_2$ and $A_3$ in the formula (2) denotes $SO_3H$ or $PO_3H_2$, and the other denotes an acidic group selected from the group consisting of $SO_3H$, $PO_3H_2$, COOH, and OH, and R denotes a divalent organic group having 1 to 20 carbon atoms, at least one of $A_2$, $A_3$, and $A_4$ in the formula (3) denotes $SO_3H$ or $PO_3H_2$, and the other denotes an acidic group selected from the group consisting of $SO_3H$, $PO_3H_2$, COOH, and OH, and R denotes a trivalent organic group having 1 to 20 carbon atoms, and at least one of $A_2$, $A_3$, $A_4$, and $A_5$ in the formula (4) denotes $SO_3H$ or $PO_3H_2$, and the other denotes an acidic group selected from the group consisting of $SO_3H$, $PO_3H_2$, COOH, and OH, and R denotes a tetravalent organic group having 1 to 20 carbon atoms.

Further features of the present disclosure will become apparent from the following description of exemplary embodiments with reference to the attached drawings.

DESCRIPTION OF THE EMBODIMENTS

Figure 1A:
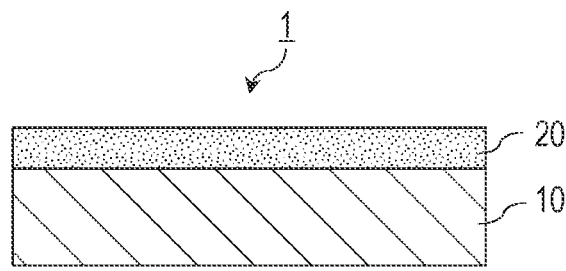
FIGS. 1A to 1C are schematic views of a member according to one or more embodiments of the present disclosure.
Figure 1B:
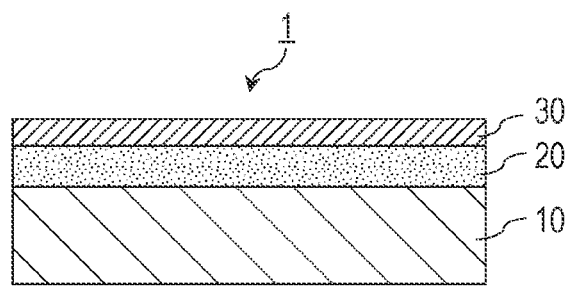

FIGS. 1A and 1B are schematic views of a member 1 according to an embodiment of the present disclosure. In FIG. 1A, the member 1 includes a substrate 10 and a porous layer 20 containing silicon oxide particles located on the substrate 10.

If necessary, as illustrated in FIG. 1B, a functional layer 30, such as an antifouling layer or a hydrophilic layer, may be provided on a surface of the porous layer 20 opposite the substrate 10. The antifouling layer may be a fluoropolymer-containing layer, a fluorosilane monolayer, or a layer containing titanium oxide particles. The hydrophilic layer can be a hydrophilic polymer layer, particularly a layer containing a polymer with a zwitterionic hydrophilic group, such as a sulfobetaine group, a carboxybetaine group, or a phosphorylcholine group.

Figure 1C:
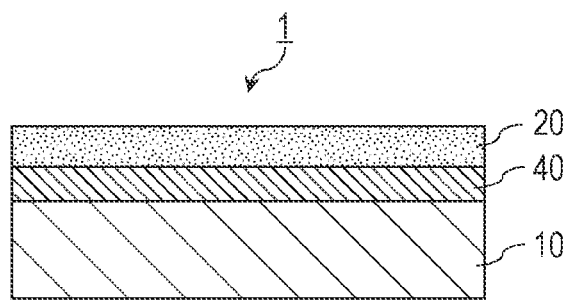

As illustrated in FIG. 1C, the member 1 may include an intermediate layer 40 between the substrate 10 and the porous layer 20 containing particles. The intermediate layer 40 can prevent diffusion of impurities from the substrate and improve antireflection performance. The intermediate layer 40 may be an inorganic compound layer, such as an oxide or nitride, or a polymer layer. The intermediate layer 40 may be a single layer formed of the above material or a laminate of a plurality of types of layers. To enhance antireflection performance, a high-refractive-index layer with a relatively high refractive index and a low-refractive-index layer with a relatively low refractive index can be alternately stacked. The high-refractive-index layer can have a refractive index of 1.4 or more and can be a layer containing any one selected from the group consisting of zirconium oxide, titanium oxide, tantalum oxide, niobium oxide, and hafnium oxide. The low-refractive-index layer can have a refractive index of less than 1.4 and can be a layer containing any one selected from the group consisting of silicon oxide and magnesium fluoride. Together with the intermediate layer 40, the functional layer 30 may be provided on a surface of the porous layer 20.

The member 1 according to the present disclosure can be used as a lens, a mirror, a filter, a functional film, or the like depending on the form of the substrate 10. In particular, the member 1 according to the present disclosure is suitable for applications that require antireflection performance, for example, optical lenses and antireflection films. For example, the member 1 according to the present disclosure can be used to cover glasses of semiconductors and liquid crystal displays, for light-transmitting shield members, such as face shields and shield partitions, and for optical systems of various optical apparatuses. Among these, the member 1 according to the present disclosure is suitable for lenses constituting imaging optical systems of imaging apparatuses that require high antireflection performance. The member 1 according to the present disclosure can also be attached to another member via an adhesive layer.

Although some embodiments according to the present disclosure are more specifically described below, these embodiments can be appropriately modified without departing from the gist of the present disclosure, and the present disclosure is not limited to these embodiments.

Substrate

The substrate 10 may be formed of glass, ceramic, resin, or metal. The substrate 10 may have any shape, such as a flat sheet, a curved substrate with a concave or convex surface, or a film. Depending on the intended use, a light-transmitting substrate may be used.

The composition of glass and ceramics is not particularly limited. Examples include zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, and aluminum oxide. The substrate can be produced by a method such as grinding and polishing, molding, or float forming.

The resin can be a thermoplastic resin or a thermosetting resin. Examples of the thermoplastic resin include poly(ethylene terephthalate) (PET), poly(ethylene naphthalate), polypropylene (PP), poly(methyl methacrylate) (PMMA, acrylic resin), cellulose triacetate, polycarbonate (PC), cycloolefin polymers, and poly(vinyl alcohol). Examples of the thermosetting resin include polyimides, epoxy resins, and urethane resins.

Examples of the metal include a metal composed of one metal element and alloys containing two or more elements.

[Porous Layer Containing Particles]

Figure 2A:
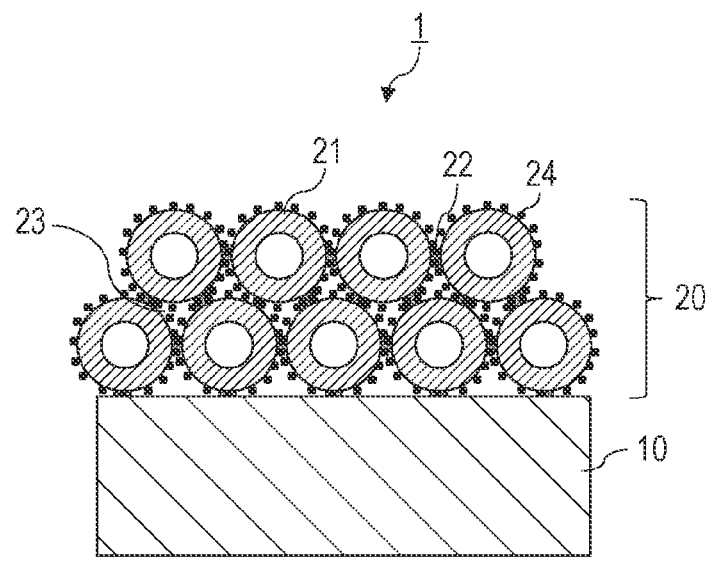
FIG. 2A is a schematic view of a member having a porous layer containing hollow silicon oxide particles according to an embodiment of the present disclosure.
Figure 2B:
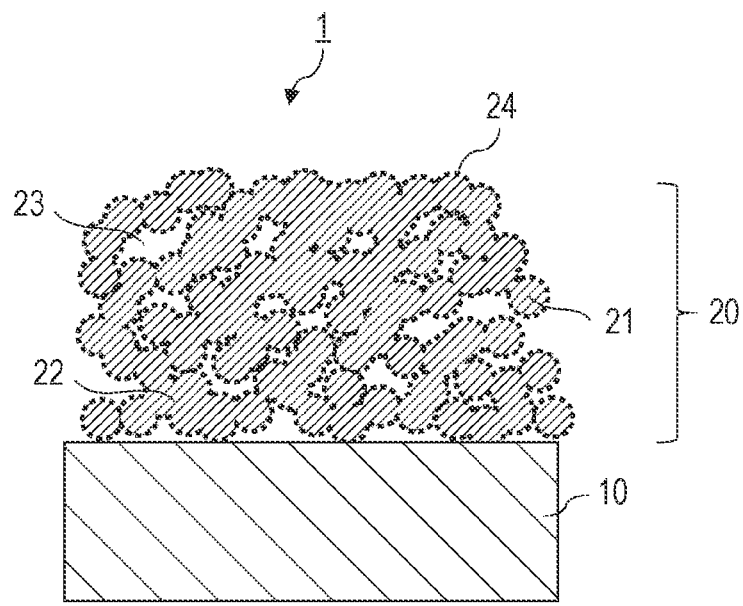
FIG. 2B is a schematic view of a member having a porous layer containing chainlike silicon oxide particles according to an embodiment of the present disclosure.

FIGS. 2A and 2B are schematic partial enlarged views of the porous layer 20 containing particles of a member according to the present disclosure. FIG. 2A illustrates hollow silicon oxide particles 21, and FIG. 2B illustrates chainlike silicon oxide particles 21 (connected solid particles). The porous layer 20 has a plurality of empty spaces 23 between the silicon oxide particles 21 bound by an inorganic binder 22 and contains an acid 24 in the layer. As illustrated in FIGS. 2A and 2B, the porous layer 20 includes the silicon oxide particles 21 almost uniformly stacked on the surface of the substrate 10.

When used as an antireflection layer, the porous layer 20 preferably has a refractive index in the range of 1.20 to 1.30, more preferably 1.20 to 1.24. A refractive index of less than 1.20 results in the porous layer with insufficient strength due to a high ratio of empty spaces in the layer. A refractive index of more than 1.30 may result in an insufficient decrease in the refractive index difference between the air and the substrate 10 and insufficient antireflection effects.

The porous layer 20 can have a hydrophilic surface. More specifically, the contact angle of pure water at a room temperature of 23° C. and at a humidity in the range of 40% RH to 45% RH preferably ranges from 3 to 20 degrees, more preferably 5 to 10 degrees. A contact angle of pure water of less than 3 degrees tends to result in permeation of moisture in the porous layer 20 from the surface of the porous layer 20 and impaired environmental stability. A contact angle of pure water of more than 20 degrees tends to result in weak bonding between the silicon oxide particles 21 and result in the porous layer 20 with low wear resistance.

Each component is now described in detail below.

Acid

The acid 24 in the porous layer 20 according to the present disclosure has 2 to 4 acidic groups and satisfies one of the following formulae (1) to (4). Acids with five or more acidic groups are difficult to dissolve in solvents and therefore tend to separate in the coating liquid. Furthermore, acids with five or more acidic groups may cause steric hindrance in the porous layer, disturb the arrangement of the particles, and cause light scattering.

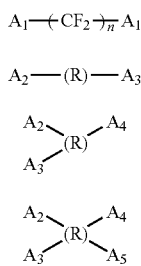

$A_1$ in the formula (1) denotes COOH. n denotes an integer in the range of 2 to 8. An acid satisfying the formula (1) may be tetrafluorosuccinic acid, hexafluoroglutaric acid, octafluoroadipic acid, dodecafluorosuberic acid, or hexadecafluorosebacic acid.

At least one of $A_2$ and $A_3$ in the formula (2) denotes $SO_3H$ or $PO_3H_2$, and the other denotes an acidic group selected from the group consisting of $SO_3H$, $PO_3H_2$, COOH, and OH. At least one of $A_2$ and $A_3$ denotes $SO_3H$ or $PO_3H_2$. R denotes a divalent organic group having 1 to 20 carbon atoms. An acid satisfying the formula (2) may be 4,4'-biphenyldisulfonic acid, methylenediphosphonic acid, 4-phosphonobenzoic acid, 4-phosphonobutyric acid, 3-amino-4-hydroxy-5-nitrobenzenesulfonic acid, 5-amino-1-naphthol-3-sulfonic acid, 6-amino-1-naphthol-3-sulfonic acid, 1-amino-2-naphthol-4-sulfonic acid, 2,2'-benzidinedisulfonic acid, or 4,4'-diaminostilbene-2,2'-disulfonic acid.

Each of $A_2$, $A_3$, and $A_4$ in the formula (3) denotes an acidic group selected from the group consisting of $SO_3H$, $PO_3H_2$, COOH, and OH. At least one of $A_2$, $A_3$, and $A_4$ denotes $SO_3H$ or $PO_3H_2$. R denotes a trivalent organic group having 1 to 20 carbon atoms. An acid satisfying the formula (3) may be nitrilotris, 1-hydroxyethane-1,1-diphosphonic acid, alendronic acid, N,N-Bis glycine or 4-sulfophthalic acid.

Each of $A_2$, $A_3$, $A_4$, and $A_5$ in the formula (4) denotes an acidic group selected from the group consisting of $SO_3H$, $PO_3H_2$, COOH, and OH. At least one of $A_2$, $A_3$, $A_4$, and $A_5$ denotes $SO_3H$ or $PO_3H_2$. R denotes a tetravalent organic group having 1 to 20 carbon atoms. An acid satisfying the formula (4) may be N,N,N',N'-ethylenediaminetetrakis, 2-phosphonobutane-1,2,4-tricarboxylic acid, or 2-hydroxy-1-(2-hydroxy-4-sulfo-1-naphthylazo)-3-naphthoic acid.

The acidic group of an acid satisfying one of the formulae (1) to (4) can modify the surface of the silicon oxide particles 21. Although an acid with only one acidic group can modify only one silicon oxide particle, an acid with two or more acidic groups as in the formulae (1) to (4) can modify a plurality of particles depending on the number of acidic groups. Consequently, the acid 24 can also bind particles together, increase the number of bonding sites between particles, and increase the strength of the porous layer 20.

The acid 24 in the porous layer 20 can be identified as one of the formulae (1) to (4) by the elemental analysis of the porous layer 20 or by the separation and quantitative analysis of organic acids by ion-exclusion chromatography or the like.

It is desirable that the acid content of the porous layer be preferably in the range of 0.1% to 10% by mass of the silicon oxide particles contained in the porous layer. An acid content of less than 0.1% by mass tends to result in insufficient dispersion of particles, irregular arrangement of particles in the layer, and the layer with low strength. An acid content of more than 10% by mass tends to result in an increase in the empty spaces in the layer due to hindrance by the acid and result in the layer with low strength.

Silicon Oxide Particles

The silicon oxide particles 21 may be spherical, cocoon-like, barrel-shaped, disk-shaped, rod-like, acicular, square or rectangular, or chainlike particles. When the porous layer 20 is used as an antireflection layer, the silicon oxide particles 21 can be hollow silicon oxide particles each having a vacancy within a shell as illustrated in FIG. 2A or chainlike silicon oxide particles, that is, connected solid particles as illustrated in FIG. 2B. It is desirable that the silicon oxide particles 21 be silicon oxide particles formed by a wet process. This is because silicon oxide particles formed by a wet process have a larger number of silanol groups (Si—OH) on the surface of the particles and therefore tend to interact more strongly with the acid 24 than silicon oxide particles formed by a dry process.

Hollow silicon oxide particles can decrease the refractive index of the porous layer 20 containing the particles due to air (refractive index 1.0) in the vacancies.

Hollow silicon oxide particles can be produced by a known method, for example, described in Japanese Patent Laid-Open No. 2001-233611 or Japanese Patent Laid-Open No. 2008-139581. When the silicon oxide particles 21 are hollow particles, a coating liquid according to the present disclosure is applied to a substrate and is dried to form layers of the hollow silicon oxide particles 21 stacked in the direction perpendicular to the surface of the substrate 10, as illustrated in FIG. 2A.

The hollow silicon oxide particles preferably have an average particle size in the range of 15 to 300 nm, more preferably 30 to 80 nm. An average particle size of less than 15 nm makes it difficult to consistently produce the particles. An average particle size of more than 300 nm tends to result in a large void between particles and scattering by the silicon oxide particles. However, when the porous layer 20 is not used as an antireflection film, the average particle size is not necessarily 300 nm or less.

The average particle size of hollow silicon oxide particles is an average Feret diameter. The average Feret diameter can be determined by image processing of a transmission electron micrograph of hollow silicon oxide particles contained in the coating liquid. The image processing may be commercial image processing, such as image Pro PLUS (manufactured by Media Cybernetics, Inc.). In a predetermined image region, the contrast can be appropriately adjusted if necessary, and the Feret diameter of each particle can be measured by particle measurement. The average value of a plurality of particles can be calculated.

The thickness of the shell of each hollow silicon oxide particle ranges from 10% to 50%, preferably 20% to 35%, of the average particle size. A shell thickness of less than 10% results in particles with insufficient strength. A shell thickness of more than 50% results in a small ratio of the empty space to the cubic content of the particle; therefore, the effects of hollow silicon oxide particles cannot be produced, that is, a layer with a refractive index of 1.3 or less cannot be formed.

Chainlike silicon oxide particles are secondary particles composed of a linearly or crookedly connected primary solid silicon oxide particles. The size of a chainlike particle can be expressed by a short diameter and a long diameter. The short diameter of a chainlike particle corresponds to the thickness of the chainlike particle, in other words, the average particle size of one primary particle. The short diameter can be calculated from the specific surface area of a chainlike particle extracted from a coating liquid determined by a nitrogen adsorption method. The chainlike silicon oxide particles preferably have an average short diameter in the range of 8 to 20 nm. A short diameter of less than 8 nm may result in an excessively large surface area of the silicon oxide particles 21 and a layer with low reliability due to absorption of moisture and chemical substances from the atmosphere. On the other hand, an average short diameter of more than 20 nm may result in unstable dispersion in a solvent and poor coatability.

The long diameter of a chainlike silicon oxide particle corresponds to the length of a secondary particle. The long diameter of particles in a coating liquid can be determined by a dynamic light scattering method. The long diameter of the chainlike silicon oxide particles preferably ranges from 4 to 8 times the short diameter. A long diameter less than 4 times the short diameter may result in a dense layer with an insufficiently decreased refractive index. A long diameter more than 8 times results in a coating liquid with high viscosity and poor coatability and leveling.

The short diameter and long diameter of chainlike silicon oxide particles in the layer can be calculated from a scanning electron micrograph. The short diameter and long diameter can be determined from an image taken with a scanning electron microscope.

Primary particles constituting chainlike silicon oxide particles may have individual clearly observed shapes or deformed shapes due to fusion of particles. The primary particles can have individual clearly observed shapes. Primary particles constituting chainlike silicon oxide particles may be spherical, cocoon-like, or barrel-shaped and can be cocoon-like or barrel-shaped. Primary particles constituting chainlike silicon oxide particles are particularly preferably particles with a short diameter in the range of 8 to 20 nm and a long diameter in the range of 1.5 to 3.0 times the short diameter.

The coating liquid may contain particles with shapes other than spherical, cocoon-like, barrel-shaped, disk-shaped, rod-like, acicular, and square or rectangular chainlike silicon oxide particles. However, an excessively high number of particles with shapes other than chainlike silicon oxide particles results in a high refractive index. It is desirable in terms of optical performance that such particles be added such that the refractive index does not exceed approximately 1.3.

Regardless of their shapes, silicon oxide particles can have a surface that can be bound by a binder described later.

Inorganic Binder

The inorganic binder 22 for binding silicon oxide particles can be a silicon oxide compound. The silicon oxide compound can be a cured product of a silicon oxide oligomer formed by hydrolysis and condensation of a silicate.

When the inorganic binder 22 is an inorganic material of the same quality as silicon oxide particles, the inorganic binder 22 can increase the bond strength between particles, and the porous layer is less likely to deteriorate in the use environment.

It is desirable that the binder content of the porous layer be in the range of 5% to 20% by mass, more desirably 6% to 17% by mass, of the silicon oxide particles contained in the porous layer. A binder content of less than 5% by mass tends to result in the layer with low strength. A binder content of more than 20% by mass may result in an increased refractive index and a low-refractive-index layer with insufficient optical performance.

Figure 3:
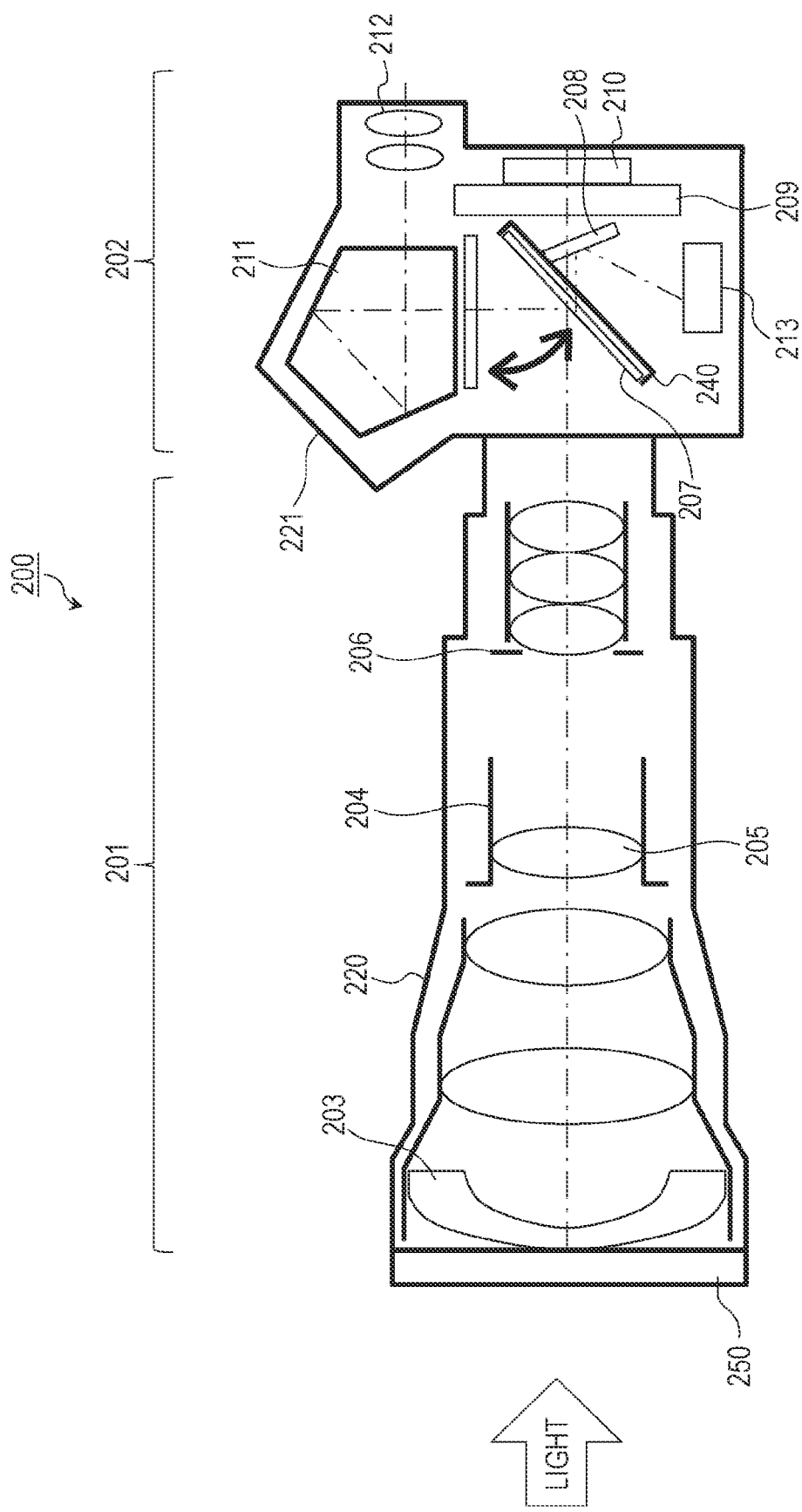
FIG. 3 is a schematic view of an imaging apparatus including a member according to the present disclosure.

FIG. 3 illustrates an imaging apparatus including a lens barrel (interchangeable lens) as an optical apparatus including a member according to the present disclosure. FIG. 3 illustrates a digital single-lens reflex camera to which a lens barrel (interchangeable lens) is attached.

The term "optical apparatus", as used herein, refers to an apparatus with an optical system, such as a binocular, a microscope, a semiconductor exposure apparatus, or an interchangeable lens.

The term "imaging apparatus", as used herein, refers to electronic equipment including an imaging device for receiving light passing through an optical device, for example, a camera system, such as a digital still camera or a digital camcorder, or a mobile phone. The imaging apparatus may also be a modular form mounted on electronic equipment, for example, a camera module.

Although a camera body 202 is coupled to a lens barrel 201, which is an optical apparatus, in FIG. 3, the lens barrel 201 is an interchangeable lens detachably mounted on the camera body 202.

Light from an object passes through an optical system including lenses 203 and 205 arranged on the optical axis of an imaging optical system in a housing 220 of the lens barrel 201 and is received by an imaging device. A member according to the present disclosure can also be used as a lens constituting an optical system.

The lens 205 is movably supported by an inner tube 204 relative to an outer tube of the lens barrel 201 for focusing and zooming.

In the observation period before photographing, light from an object is reflected by a main mirror 207 in a housing 221 of the camera body, passes through a prism 211, and then provides the photographer with an image to be photographed through a viewing lens 212. The main mirror 207 is a half mirror, for example. Light transmitted through the main mirror is reflected by a sub-mirror 208 in the direction of an autofocusing (AF) unit 213, and the reflected beam is used for focusing, for example. The main mirror 207 is attached to and supported by a main mirror holder 240 by adhesion or the like. For photographing, the main mirror 207 and the sub-mirror 208 are moved out of the optical path by a driving mechanism (not shown), a shutter 209 is opened, and an optical image to be photographed incident from the lens barrel 201 is focused on an imaging device 210. Furthermore, the diaphragm 206 is configured to change the aperture area and thereby change the brightness and the depth of focus while photographing.

A member according to the present disclosure can be used as a lens constituting an optical system, suppress reflection and scattering in the optical system, and provide a good image.

Figure 4:
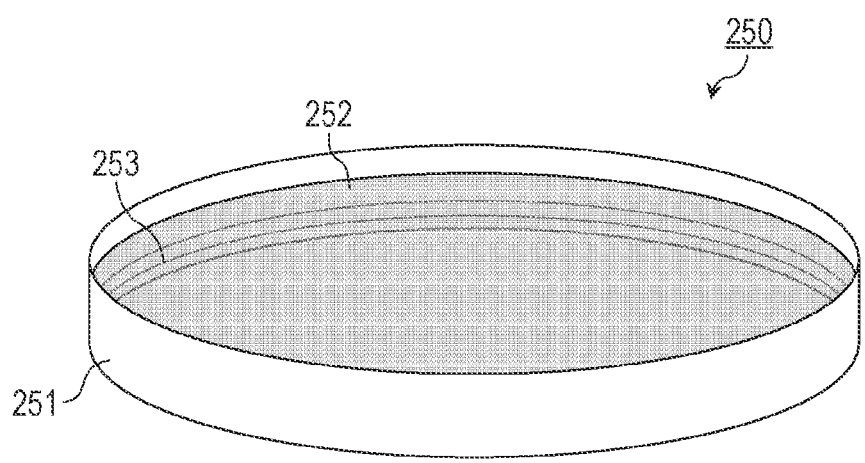
FIG. 4 is a schematic view of a lens filter including a member according to the present disclosure.

Furthermore, due to the porous layer 20 with high mechanical strength, a member according to the present disclosure is suitable for a lens filter 250 to be installed on the outermost side of the optical system. Depending its type, the lens filter 250 has a function of protecting a lens or producing soft, color tone change, polarization, light reduction, and other effects on an image thus formed. FIG. 4 illustrates an example of the lens filter 250.

The lens filter 250 includes a member (filter member) 252 according to the present disclosure fitted into a frame 251 provided with a mounting portion 253, such as a screw thread or a bayonet mount, for mounting the lens filter 250 on the housing 220 of the interchangeable lens. The filter member 252 has the porous layer 20 opposite the mounting portion 253 of the frame 251. When the lens filter 250 is mounted on the housing 220, the porous layer 20 is positioned on the light incident surface.

Figure 5A:
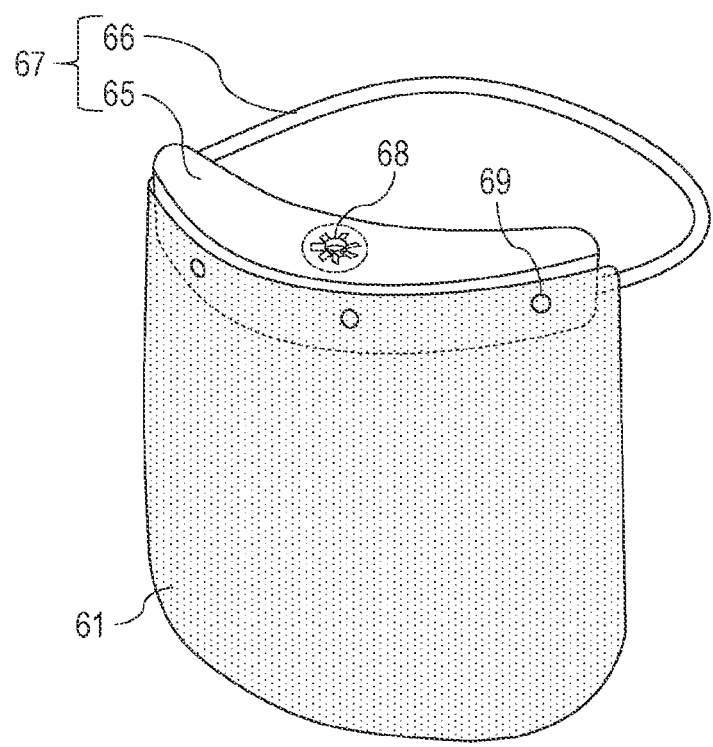
FIG. 5A is a schematic view of a face shield including a member according to the present disclosure as a light-transmitting member.
Figure 5B:
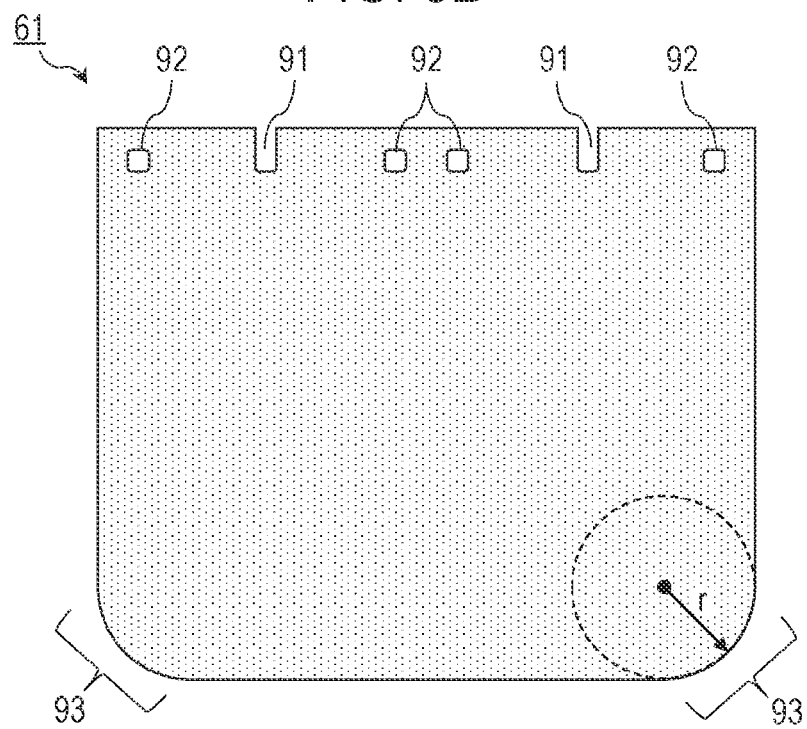
FIG. 5B is a schematic view of the light-transmitting member.

A member according to the present disclosure can be adopted as a light-transmitting member of a face shield. FIG. 5A is a schematic view of a face shield 60. The face shield 60 includes a light-transmitting member 61 and a holder 67 for holding the light-transmitting member 61. The holder 67 has a structure for fixing the light-transmitting member 61 to the user such that the light-transmitting member 61 covers at least part of user's face. The holder 67 includes a fixing portion 65 to which the light-transmitting member 61 is fixed, and a supporting portion 66 for fixing the fixing portion 65 to the user. The supporting portion 66 is connected to the fixing portion 65. The fixing portion 65 is rod-like, and a peripheral portion of the light-transmitting member 61 is fixed to a side surface of the fixing portion 65 with a fixing component 69, such as a pin or screw. The fixing component 69 can pass through a notch 91 and/or a hole 92 of the light-transmitting member 61 illustrated in FIG. 5B. The belt-like supporting portion 66 is attached to a wearer and supports the fixing portion 65. The light-transmitting member 61 of the face shield 60 covers at least one or all of the eyes, nose, and mouth of the user, for example.

The outer surface (a surface opposite the face side) of the light-transmitting member 61 of the face shield 60 can be a front surface, and the inner surface (the surface on the face side) can be a back surface. A light source on the outer surface side can be a main factor of reflected beam, and the porous layer can face the outer surface side to produce antireflection effects. Furthermore, when the face shield 60 is used, scratches are more likely to occur on the outer surface than on the inner surface. Thus, considering the scratch resistance of the light-transmitting member 61, the porous layer can be provided on the outer surface side. When the porous layer is provided on both sides, the porous layer on the outer surface side can be thicker than the porous layer on the inner surface side.

The face shield 60 may be provided with a ventilation fan 68 for ventilating the atmosphere adjacent to the light-transmitting member 61. In this example, the ventilation fan 68 is provided inside the holder 67 (fixing portion 65).

The use of the face shield 60 according to the present example not only protects the face of the wearer but also has the effects of improving the work efficiency of the wearer due to good visibility of the light-transmitting member 61 and allowing a person who faces the wearer to easily recognize the face and expression of the wearer.

Although the face shield has been described in FIG. 5, a member according to the present disclosure is also suitable for a light-transmitting member of a shield partition.

[Coating Liquid and Method for Manufacturing Member]

Next, a coating liquid used to produce the porous layer 20 is described, and then a method for manufacturing the member 1 is described.

Coating Liquid

A coating liquid according to the present disclosure contains the silicon oxide particles 21, the acid 24, and a component serving as the inorganic binder 22, which constitute the porous layer 20, and an organic solvent.

The silicon oxide particles 21 and the acid 24 are described above.

As illustrated in FIGS. 2A and 2B, the porous layer 20 includes the silicon oxide particles 21 stacked on the surface of the substrate 10. A layer composed of unevenly arranged silicon oxide particles 21 tends to have an uneven stress distribution and decreased strength. Thus, it is desirable that the silicon oxide particles 21 be aligned to form the porous layer 20 with high strength.

The arrangement of the silicon oxide particles 21 depends mainly on the dispersion state of the silicon oxide particles 21 in a coating liquid for forming the porous layer 20 containing the particles and the dispersion state of the silicon oxide particles 21 while a coating film is formed after the coating liquid is applied to the substrate.

The silicon oxide particles 21 uniformly dispersed in the coating liquid enables the silicon oxide particles 21 to be uniformly applied to the substrate 10 and tends to result in better arrangement of the silicon oxide particles 21 in the formed layer. When the silicon oxide particles 21 in the coating liquid are dispersed in an aggregated state under the influence of the dispersion medium or the component serving as the inorganic binder 22, the particles in the aggregated state are applied to the substrate 10 and are poorly aligned.

Even when the silicon oxide particles 21 in the coating liquid have a good dispersion state, aggregation of the silicon oxide particles 21 during a drying process after the coating liquid is applied to the substrate disturbs the arrangement of the silicon oxide particles 21 in the layer.

Thus, to form a layer with high strength, it is desirable that the silicon oxide particles 21 be uniformly dispersed in the coating liquid and that the silicon oxide particles 21 do not aggregate in the drying process of the coating liquid applied to the substrate 10.

The coating liquid used to produce the porous layer 20 according to the present disclosure contains at least one acid selected from the group of acids listed in the formulae (1) to (4), and the surface of the silicon oxide particles 21 in the coating liquid is modified with the acid 24. The modification with the acid 24 causes the silicon oxide particles 21 to be charged and repel each other, suppresses aggregation of the particles, and uniformly disperses the particles. This state is maintained in the drying process of the coating liquid applied to the substrate. Thus, a coating liquid according to the present disclosure can be used to form a layer with high strength composed of regularly and densely arranged silicon oxide particles 21.

The acid 24 preferably has a molecular weight in the range of 100 to 360. A molecular weight of less than 100 tends to result in difficult application due to increased viscosity and the coating liquid with low temporal stability. A molecular weight of more than 360 results in the presence of an acid with a high molecular weight between the particles and tends to result in a large empty space in the layer and scattering.

The acid 24 content preferably ranges from 0.05% to 10% by mass, more preferably 0.1% to 2.0% by mass, of the silicon oxide particles. An acid 24 content of the coating liquid below 0.05% by mass of the silicon oxide particles tends to make it difficult to prevent aggregation of the silicon oxide particles 21 after the coating liquid is applied to the substrate. Alternatively, due to the influence of the solvent and a component serving as a binder in the coating liquid, the silicon oxide particles 21 tend to have low dispersion stability, and the coating liquid tends to become more viscous or form a gel with time.

The acid 24 constituting 10% by mass of the silicon oxide particles disturbs the arrangement of the silicon oxide particles 21, increases the number of empty spaces 23, and decreases the strength.

The acid 24 preferably has an acid dissociation constant in the range of −1.2 to 2 pKa, more preferably −1.2 to 0.3 pKa. An acid dissociation constant of less than −1.2 pKa tends to result in irregular arrangement of the silicon oxide particles 21 during the drying process after application to the substrate 10 and the layer with low strength. An acid dissociation constant of more than 2 pKa tends to result in poor dispersion of the silicon oxide particles 21 in the coating liquid, poor arrangement in the layer, and the layer with low strength.

The acids 24 represented by the formulae (1) to (4) are mostly safe while handling of raw materials and are mostly solid, and are easy to handle.

The component serving as the inorganic binder 22 can be a silicon oxide oligomer. Although silicon oxide particles originally have silanol (Si—OH) groups on the surface, the number of silanol groups on the surface can be increased by mixing with a silicon oxide oligomer in the coating liquid. Consequently, the silicon oxide particles 21 are more easily bound on the surface. When the coating liquid is applied and dried, the silicon oxide oligomer forms silicon oxide, fixes chainlike silicon oxide particles 21 in contact with each other, and can provide a layer with high scratch resistance.

In a coating liquid according to the present disclosure, the component serving as the inorganic binder 22 preferably constitutes 0.2% to 20% by mass, more preferably 0.2% to 17% by mass, of the silicon oxide particles 21. When the component serving as the inorganic binder 22 constitutes less than 0.2% by mass of the silicon oxide particles 21, the silicon oxide particles 21 is insufficiently dispersed in the dispersion liquid, and the layer tends to have low strength. When the component serving as the inorganic binder 22 constitutes more than 20% by mass of the silicon oxide particles 21, the inorganic binder disturbs the arrangement of the particles, and the layer tends to more strongly scatter visible light and have an increased refractive index.

An organic solvent that can be used in the coating liquid may be any solvent that does not precipitate the silicon oxide particles 21 or drastically increase the viscosity of the coating liquid. Examples of such a solvent include the following solvents. Monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol. Dihydric or polyhydric alcohols, such as ethylene glycol and triethylene glycol. Ether alcohols, such as methoxyethanol, ethoxyethanol, propoxyethanol, isopropoxyethanol, butoxyethanol, 1-methoxy-2-propanol, 1-ethoxy-2-propanol, 1-propoxy-2-propanol, and 3-methoxy-1-butanol; and ethers, such as dimethoxyethane, diglyme (diethylene glycol dimethyl ether), tetrahydrofuran, dioxane, diisopropyl ether, dibutyl ether, and cyclopentyl methyl ether. Esters, such as ethyl formate, ethyl acetate, n-butyl acetate, methyl lactate, ethyl lactate, ethylene glycol monomethyl ether acetate, ethylene glycol monoethyl ether acetate, ethylene glycol monobutyl ether acetate, and propylene glycol monomethyl ether acetate. Aliphatic and alicyclic hydrocarbons, such as n-hexane, n-octane, cyclohexane, cyclopentane, and cyclooctane. Aromatic hydrocarbons, such as toluene, xylene, and ethylbenzene. Ketones, such as acetone, methyl ethyl ketone, methyl isobutyl ketone, cyclopentanone, and cyclohexanone. Chlorinated hydrocarbons, such as chloroform, methylene chloride, carbon tetrachloride, and tetrachloroethane. Aprotic polarized solvents, such as N-methylpyrrolidone, N,N-dimethylformamide, N,N-dimethylacetamide, and ethylene carbonate. Two or more of these solvents may be used in combination.

From the perspectives of the dispersibility of the silicon oxide particles 21 and the coating performance of the coating liquid, 30% or more by mass of the solvent in the coating liquid can be a water-soluble solvent having 4 to 6 carbon atoms and a hydroxy group. In particular, at least one solvent selected from the group consisting of ethoxyethanol, propoxyethanol, isopropoxyethanol, butoxyethanol, 1-methoxy-2-propanol, 1-ethoxy-2-propanol, 1-propoxy-2-propanol, ethyl lactate, and 3-methoxy-1-butanol can be contained. The use of these solvents reduces radial coating marks while coating and residual liquid around the substrate and improves coatability.

Method for Manufacturing Member

A method for manufacturing the member 1 according to the present disclosure includes the steps of applying a coating liquid to the substrate 10 and drying and/or baking the substrate 10 to which the coating liquid has been applied.

The coating liquid may be applied to the substrate 10 by a spin coating method, a blade coating method, a roll coating method, a slit coating method, a printing method, a gravure coating method, or a dip coating method. A member with a three-dimensionally complicated shape, such as a concave surface, can be produced by the spin coating method, which facilitates coating with a uniform thickness.

The drying and/or baking step is the step of removing the organic solvent and bonding the silicon oxide particles 21 without disturbing the arrangement thereof to form the porous layer 20. The drying and/or baking step is preferably performed in the temperature range of 20° C. to 200° C., depending on the heat resistance temperature of the substrate 10. The time of the drying and/or baking step may be such that the organic solvent in the layer can be removed without any influence on the substrate 10 and preferably ranges from 5 minutes to 200 hours, more preferably 30 minutes to 24 hours.

EXAMPLES

In Examples 1 to 18, a coating liquid for forming the porous layer 20 was prepared by the following method, and a porous layer was formed on a substrate to prepare the member 1 with the porous layer 20. The coating liquid and the porous layer 20 were examined as described below.

<Evaluation of Coatability of Coating Liquid>

A coating liquid was dropped on a polished surface of a glass substrate (φ30 mm, 1 mm in thickness, synthetic quartz with one polished surface) and was spread with a spin coater such that the porous layer 20 had a thickness of approximately 110 nm. The appearance of the layer containing particles was visually inspected for a defect with an optical microscope and was rated in accordance with the following criteria.

A: No uneven coating is observed.

B: A few inconspicuous drop marks and foreign substances are observed.

C: Significant uneven coating, such as uneven streaks, due to foreign substances is observed with poor appearance.

The rating A was judged to be excellent coatability, and the rating B was judged to be good coatability.

<Evaluation of Strength of Porous Layer>

The porous layer 20 was formed on a polished surface of a glass substrate (430 mm, 1 mm in thickness, synthetic quartz with one polished surface). A polyester wiper (Alpha Wiper TX1009 manufactured by Texwipe) was moved reciprocally 50 times at a load of 300 g/cm$^2$ on the surface of the porous layer 20. The appearance was evaluated with an optical microscope. The evaluation criteria were as follows:

A: Little change in appearance is observed.
B: A small change in appearance is observed, and a small linear scratch or the like is observed.
C: A significant change in appearance is observed, and linear scratches and peeling are observed.

In the present disclosure, the rating A was judged to be very high strength, and the rating B was judged to be high strength without problems.

<Evaluation of Refractive Index of Porous Layer>

The porous layer 20 containing particles was formed on a polished surface of a glass substrate (φ30 mm, 1 mm in thickness, synthetic quartz with one polished surface). Light was incident on the porous layer 20 using a spectroscopic ellipsometer (VASE, manufactured by J. A. Woollam Japan Co., Inc.). The reflected beam was measured in the wavelength range of 380 to 800 nm to calculate a refractive index. The refractive index at a wavelength of 550 nm was rated in accordance with the following criteria.

A: 1.24 or less
B: more than 1.24 and 1.30 or less
C: more than 1.30

The rating A or B was judged that the porous layer was suitable for a low-refractive-index layer.

<Evaluation of Scattering of Porous Layer>

A glass substrate (φ30 mm, 1 mm in thickness, synthetic quartz with polished surfaces on both sides) was placed in a substrate holder. An illuminometer (T-10M manufactured by Konica Minolta Sensing) was installed in the substrate holder. While the illuminance was measured, the surface of the substrate was irradiated with white light such that the illuminance in the vertical direction was 4000 lux. Next, a member having the porous layer 20 on the glass substrate was placed in a substrate holder such that white light was incident on the porous layer 20 side. The member was tilted at 45 degrees and was photographed with a camera (lens: EF50 mm F2.5 Compact Macro manufactured by CANON KABUSHIKI KAISHA, camera: EOS-70D manufactured by CANON KABUSHIKI KAISHA) in the direction normal to the surface opposite the surface to be irradiated. The imaging conditions of the camera were ISO 400, white balance: fair weather, diaphragm: 10, and a shutter speed: 10 seconds. The average luminance of four positions in 700 pixels×700 pixels in a captured image was calculated as a scattering value.

In the present disclosure, the porous layer 20 with a scattering value of 25 or less as calculated by this method was judged to have low scattering.

<Contact Angle of Porous Layer>

Pure water was dropped on the surface of the porous layer opposite the substrate, and the contact angle of the pure water was measured at a room temperature of 23° C. and at a humidity in the range of 40% RH to 45% RH. The contact angle was measured by taking an image 1000 ms after the pure water was dropped.

Example 1

While 1-ethoxy-2-propanol was added to 400 g of an isopropyl alcohol dispersion liquid of hollow silicon oxide particles (Thrulya 1110 manufactured by JGC Catalysts and Chemicals Ltd., average particle size: approximately 50 nm, shell thickness: approximately 10 nm, solid content: 20.5% by mass), isopropyl alcohol was evaporated by heating. The isopropyl alcohol was evaporated to a solid content of 19.5% by mass. Thus, 420 g of a 1E2P solvent-substituted liquid of hollow silicon oxide particles (hereinafter referred to as a solvent-substituted liquid 1) was prepared. An acid was added to the solvent-substituted liquid 1 such that the mass ratio of hollow silicon oxide particles:acid component was 400:1. Thus, a dispersion liquid 1 was prepared. The acid added was an acid with two acidic groups (tetrafluorosuccinic acid manufactured by Tokyo Chemical Industry Co., Ltd.).

In a separate container, 13.82 g of ethanol and an aqueous nitric acid (concentration: 3%) were added to 12.48 g of ethyl silicate. The mixture was stirred at room temperature for 10 hours to prepare a silica sol 1 (solid content: 11.5% by mass). Gas chromatography showed that the raw material ethyl silicate was completely reacted.

The dispersion liquid 1 was diluted with ethyl lactate to a solid content of 3.9% by mass. The silica sol 1 was then added to the dispersion liquid 1 such that the ratio of hollow silicon oxide particles:silica sol component was 100:11. The mixture was then mixed by stirring at room temperature for 2 hours to prepare a coating liquid 1 containing hollow silicon oxide particles.

The coating liquid 1 was dropped on a glass substrate and was spread with a spin coater such that the resulting porous layer had a thickness of approximately 110 nm, and was then baked in a thermostatic oven at 140° C. for 30 minutes to prepare a member 1-1 including a porous layer 20-1 containing particles. The contact angle of pure water on the surface of the porous layer 20-1 opposite the substrate was 10 degrees.

Example 2

An acid was added to the solvent-substituted liquid 1 such that the ratio of hollow silicon oxide particles:acid component was 400:1. Thus, a dispersion liquid 2 was prepared. The acid added was an acid with two acidic groups (octafluoroadipic acid manufactured by Tokyo Chemical Industry Co., Ltd.).

The dispersion liquid 2 was diluted with ethyl lactate to a solid content of 3.9% by mass. The silica sol 1 was then added to the dispersion liquid 2 such that the mass ratio of hollow silicon oxide particles:silica sol component was 100:11. The mixture was then mixed by stirring at room temperature for 2 hours to prepare a coating liquid 2 containing hollow silicon oxide particles.

The coating liquid 2 was dropped on a glass substrate and was spread with a spin coater such that the resulting porous layer had a thickness of approximately 110 nm, and was then baked in a thermostatic oven at 140° C. for 30 minutes to prepare a member 1-2 including a porous layer 20-2 containing particles. The contact angle of pure water on the surface of the porous layer 20-2 opposite the substrate was 10 degrees.

Example 3

While 1-methoxy-2-propanol (hereinafter abbreviated to PGME) was added to 350 g of an aqueous dispersion liquid of hydrophilic silicon oxide particles (PL-1 manufactured by Fuso Chemical Co., Ltd., average particle size: approximately 15 nm, long diameter/short diameter=2.6, solid content: 12% by mass), water was evaporated by heating. The water was evaporated to a solid content of 15% by mass. Thus, 280 g of a PGME solvent-substituted liquid of hydrophilic silicon oxide particles (hereinafter referred to as a solvent-substituted liquid 2) was prepared. An acid was added to the solvent-substituted liquid 2 such that the mass ratio of hydrophilic silicon oxide particles:acid component was 100:1. Thus, a dispersion liquid 3 was prepared. The acid added was an acid with three acidic groups (nitrilotris manufactured by Tokyo Chemical Industry Co., Ltd.).

The dispersion liquid 3 was diluted with 1-propoxy-2-propanol to a solid content of 4.5% by mass. The silica sol 1 was then added to the dispersion liquid 3 such that the ratio of hydrophilic silicon oxide particles:silica sol component was 100:6. The mixture was then mixed by stirring at room temperature for 2 hours to prepare a coating liquid 3 containing hydrophilic silicon oxide particles.

The coating liquid 3 was dropped on a glass substrate and was spread with a spin coater such that the resulting porous layer had a thickness of approximately 110 nm, and was then baked in a thermostatic oven at 140° C. for 30 minutes to prepare a member 1-3 including a porous layer 20-3 containing chainlike silicon oxide particles. The contact angle of pure water on the surface of the porous layer 20-3 opposite the substrate was 6 degrees.

Example 4

An acid was added to the solvent-substituted liquid 2 such that the mass ratio of hydrophilic silicon oxide particles:acid component was 200:1. Thus, a dispersion liquid 4 was prepared. The acid added was an acid with four acidic groups (N,N,N',N'-ethylenediaminetetrakis manufactured by Tokyo Chemical Industry Co., Ltd.).

The dispersion liquid 4 was diluted with 1-propoxy-2-propanol to a solid content of 4.5% by mass. The silica sol 1 was then added to the dispersion liquid 4 such that the mass ratio of hydrophilic silicon oxide particles:silica sol component was 100:6. The mixture was then mixed by stirring at room temperature for 2 hours to prepare a coating liquid 4 containing hydrophilic silicon oxide particles.

The coating liquid 4 was dropped on a glass substrate and was spread with a spin coater such that the resulting porous layer had a thickness of approximately 110 nm, and was then baked in a thermostatic oven at 140° C. for 30 minutes to prepare a member 1-4 including a porous layer 20-4 containing chainlike silicon oxide particles. The contact angle of pure water on the surface of the porous layer 20-4 opposite the substrate was 7 degrees.

Example 5

An acid was added to the solvent-substituted liquid 2 such that the mass ratio of hydrophilic silicon oxide particles:acid component was 200:1. Thus, a dispersion liquid 5 was prepared. The acid added was an acid with two acidic groups (tetrafluorosuccinic acid manufactured by Tokyo Chemical Industry Co., Ltd.).

The dispersion liquid 5 was diluted with 1-propoxy-2-propanol to a solid content of 4.5% by mass. The silica sol 1 was then added to the dispersion liquid 5 such that the mass ratio of hydrophilic silicon oxide particles:silica sol component was 100:6. The mixture was then mixed by stirring at room temperature for 2 hours to prepare a coating liquid 5 containing hydrophilic silicon oxide particles.

The coating liquid 5 was dropped on a glass substrate and was spread with a spin coater such that the resulting porous layer had a thickness of approximately 110 nm, and was then baked in a thermostatic oven at 140° C. for 30 minutes to prepare a member 1-5 including a porous layer 20-5 containing chainlike silicon oxide particles. The contact angle of pure water on the surface of the porous layer 20-5 opposite the substrate was 7 degrees.

Example 6

An acid was added to the solvent-substituted liquid 1 such that the mass ratio of hollow silicon oxide particles:acid component was 500:1. Thus, a dispersion liquid 6 was prepared. The acid added was an acid with two acidic groups (tetrafluorosuccinic acid manufactured by Tokyo Chemical Industry Co., Ltd.).

The dispersion liquid 6 was diluted with ethyl lactate to a solid content of 3.9% by mass. The silica sol 1 was then added to the dispersion liquid 6 such that the mass ratio of hollow silicon oxide particles:silica sol component was 100:6. The mixture was then mixed by stirring at room temperature for 2 hours to prepare a coating liquid 6 containing hollow silicon oxide particles.

The coating liquid 6 was dropped on a glass substrate and was spread with a spin coater such that the resulting porous layer had a thickness of approximately 110 nm, and was then baked in a thermostatic oven at 140° C. for 30 minutes to prepare a member 1-6 including a porous layer 20-6 containing particles. The contact angle of pure water on the surface of the porous layer 20-6 opposite the substrate was 10 degrees.

Example 7

An acid was added to the solvent-substituted liquid 1 such that the ratio of hollow silicon oxide particles:acid component was 250:1. Thus, a dispersion liquid 7 was prepared. The acid added was an acid with two acidic groups (octafluoroadipic acid manufactured by Tokyo Chemical Industry Co., Ltd.).

The dispersion liquid 7 was diluted with ethyl lactate to a solid content of 3.9% by mass. The silica sol 1 was then added to the dispersion liquid 7 such that the mass ratio of hollow silicon oxide particles:silica sol component was 100:11. The mixture was then mixed by stirring at room temperature for 2 hours to prepare a coating liquid 7 containing hollow silicon oxide particles.

The coating liquid 7 was dropped on a glass substrate and was spread with a spin coater such that the resulting porous layer had a thickness of approximately 110 nm, and was then baked in a thermostatic oven at 140° C. for 30 minutes to prepare a member 1-7 including a porous layer 20-7 containing particles. The contact angle of pure water on the surface of the porous layer 20-7 opposite the substrate was 10 degrees.

Example 8

An acid was added to the solvent-substituted liquid 2 such that the ratio of hydrophilic silicon oxide particles:acid component was 100:1. Thus, a dispersion liquid 8 was prepared. The acid added was an acid with two acidic groups (tetrafluorosuccinic acid manufactured by Tokyo Chemical Industry Co., Ltd.).

The dispersion liquid 8 was diluted with 1-propoxy-2-propanol to a solid content of 4.5% by mass. The silica sol 1 was then added to the dispersion liquid 8 such that the ratio of hydrophilic silicon oxide particles:silica sol component was 100:6. The mixture was then mixed by stirring at room temperature for 2 hours to prepare a coating liquid 8 containing hydrophilic silicon oxide particles.

The coating liquid 8 was dropped on a glass substrate and was spread with a spin coater such that the resulting porous layer had a thickness of approximately 110 nm, and was then baked in a thermostatic oven at 140° C. for 30 minutes to prepare a member 1-8 including a porous layer 20-8 containing chainlike silicon oxide particles. The contact angle of pure water on the surface of the porous layer 20-8 opposite the substrate was 7 degrees.

Example 9

An acid was added to the solvent-substituted liquid 2 such that the ratio of hydrophilic silicon oxide particles:acid component was 10:1. Thus, a dispersion liquid 9 was prepared. The acid added was an acid with two acidic groups (tetrafluorosuccinic acid manufactured by Tokyo Chemical Industry Co., Ltd.).

The dispersion liquid 9 was diluted with 1-propoxy-2-propanol to a solid content of 4.5% by mass. The silica sol 1 was then added to the dispersion liquid 9 such that the mass ratio of hydrophilic silicon oxide particles:silica sol component was 100:6. The mixture was then mixed by stirring at room temperature for 2 hours to prepare a coating liquid 9 containing hydrophilic silicon oxide particles.

The coating liquid 9 was dropped on a glass substrate and was spread with a spin coater such that the resulting porous layer had a thickness of approximately 110 nm, and was then baked in a thermostatic oven at 140° C. for 30 minutes to prepare a member 1-9 including a porous layer 20-9 containing particles. The contact angle of pure water on the surface of the porous layer 20-9 opposite the substrate was 6 degrees.

Example 10

An acid was added to the solvent-substituted liquid 1 such that the ratio of hollow silicon oxide particles:acid component was 200:1. Thus, a dispersion liquid 10 was prepared. The acid added was an acid with two acidic groups (dodecafluorosuberic acid manufactured by Tokyo Chemical Industry Co., Ltd.).

11.41 g of 1-propoxy-2-propanol and 4.5 g of methyl polysilicate (Methyl Silicate 53A manufactured by Colcoat Co., Ltd.) were slowly added to a separate container and were stirred at room temperature for 120 minutes to prepare a silica sol (hereinafter referred to as a silica sol 2).

The dispersion liquid 10 was diluted with 1-propoxy-2-propanol to a solid content of 3.9% by mass. The silica sol 2 was then added to the dispersion liquid 10 such that the mass ratio of hollow silicon oxide particles:silica sol component was 100:11. The mixture was then mixed by stirring at room temperature for 2 hours to prepare a coating liquid 10 containing hollow silicon oxide particles.

The coating liquid 10 was dropped on a glass substrate and was spread with a spin coater such that the resulting porous layer had a thickness of approximately 110 nm, and was then baked in a thermostatic oven at 140° C. for 30 minutes to prepare a member 1-10 including a porous layer 20-10 containing particles. The contact angle of pure water on the surface of the porous layer 20-10 opposite the substrate was 10 degrees.

Example 11

An acid was added to the solvent-substituted liquid 1 such that the ratio of hollow silicon oxide particles:acid component was 200:1. Thus, a dispersion liquid 11 was prepared. The acid added was an acid with two acidic groups (dodecafluorosuberic acid manufactured by Tokyo Chemical Industry Co., Ltd.).

The dispersion liquid 11 was diluted with ethyl lactate to a solid content of 3.9% by mass. The silica sol 2 was then added to the dispersion liquid 11 such that the mass ratio of hollow silicon oxide particles:silica sol component was 100:11. The mixture was then mixed by stirring at room temperature for 2 hours to prepare a coating liquid 11 containing hollow silicon oxide particles.

The coating liquid 11 was dropped on a glass substrate and was spread with a spin coater such that the resulting porous layer had a thickness of approximately 110 nm, and was then baked in a thermostatic oven at 140° C. for 30 minutes to prepare a member 1-11 including a porous layer 20-11 containing particles. The contact angle of pure water on the surface of the porous layer 20-11 opposite the substrate was 9 degrees.

Example 12

An acid was added to the solvent-substituted liquid 1 such that the ratio of hollow silicon oxide particles:acid component was 250:1. Thus, a dispersion liquid 12 was prepared. The acid added was an acid with two acidic groups (dodecafluorosuberic acid manufactured by Tokyo Chemical Industry Co., Ltd.).

The dispersion liquid 12 was diluted with 3-methoxy-1-butanol to a solid content of 3.9% by mass. The silica sol 1 was then added to the dispersion liquid 12 such that the mass ratio of hollow silicon oxide particles:silica sol component was 100:11. The mixture was then mixed by stirring at room temperature for 2 hours to prepare a coating liquid 12 containing hollow silicon oxide particles.

The coating liquid 12 was dropped on a glass substrate and was spread with a spin coater such that the resulting porous layer had a thickness of approximately 110 nm, and was then baked in a thermostatic oven at 140° C. for 30 minutes to prepare a member 1-12 including a porous layer 20-12 containing particles. The contact angle of pure water on the surface of the porous layer 20-12 opposite the substrate was 8 degrees.

Example 13

An acid was added to the solvent-substituted liquid 1 such that the ratio of hollow silicon oxide particles:acid component was 200:1. Thus, a dispersion liquid 13 was prepared. The acid added was an acid with two acidic groups (hexafluoroglutaric acid manufactured by Tokyo Chemical Industry Co., Ltd.).

The dispersion liquid 13 was diluted with 3-methoxy-1-butanol to a solid content of 3.9% by mass. The silica sol 2 was then added to the dispersion liquid 13 such that the mass ratio of hollow silicon oxide particles:silica sol component was 100:11. The mixture was then mixed by stirring at room temperature for 2 hours to prepare a coating liquid 13 containing hollow silicon oxide particles.

The coating liquid 13 was dropped on a glass substrate and was spread with a spin coater such that the resulting porous layer had a thickness of approximately 110 nm, and was then baked in a thermostatic oven at 140° C. for 30 minutes to prepare a member 1-13 including a porous layer 20-13 containing particles. The contact angle of pure water on the surface of the porous layer 20-13 opposite the substrate was 8 degrees.

Example 14

400 g of an isopropyl alcohol dispersion liquid of hollow silicon oxide particles (Thrulya 1110 manufactured by JGC Catalysts and Chemicals Ltd., average particle size: approximately 50 nm, shell thickness: approximately 10 nm, solid content: 20.5% by mass) was mixed with 1-propoxy-2-propanol to prepare a dispersion liquid 14 with a solid content of 3.9% by mass.

An acid was added to the dispersion liquid 14 such that the ratio of hollow silicon oxide particles:acid component was 250:1. The acid added was an acid with two acidic groups (dodecafluorosuberic acid manufactured by Tokyo Chemical Industry Co., Ltd.).

Furthermore, the silica sol 2 was added such that the mass ratio of hollow silicon oxide particles:silica sol component was 100:11. The mixture was then mixed by stirring at room temperature for 2 hours to prepare a coating liquid 14 containing hollow silicon oxide particles.

The coating liquid 14 was dropped on a glass substrate and was spread with a spin coater such that the resulting porous layer had a thickness of approximately 110 nm, and was then baked in a thermostatic oven at 140° C. for 30 minutes to prepare a member 1-14 including a porous layer 20-14 containing particles. The contact angle of pure water on the surface of the porous layer 20-14 opposite the substrate was 10 degrees.

Example 15

400 g of an isopropyl alcohol dispersion liquid of hollow silicon oxide particles (Thrulya 1110 manufactured by JGC Catalysts and Chemicals Ltd., average particle size: approximately 50 nm, shell thickness: approximately 10 nm, solid content: 20.5% by mass) was mixed with ethyl lactate to prepare a dispersion liquid 15 with a solid content of 3.9% by mass.

An acid was added to the dispersion liquid 15 such that the ratio of hollow silicon oxide particles:acid component was 250:1. The acid added was an acid with two acidic groups (dodecafluorosuberic acid manufactured by Tokyo Chemical Industry Co., Ltd.).

Furthermore, the silica sol 2 was added such that the mass ratio of hollow silicon oxide particles:silica sol component was 100:11. The mixture was then mixed by stirring at room temperature for 2 hours to prepare a coating liquid 15 containing hollow silicon oxide particles.

The coating liquid 15 was dropped on a glass substrate and was spread with a spin coater such that the resulting porous layer had a thickness of approximately 110 nm, and was then baked in a thermostatic oven at 140° C. for 30 minutes to prepare a member 1-15 including a porous layer 20-15 containing particles. The contact angle of pure water on the surface of the porous layer 20-15 opposite the substrate was 7 degrees.

Example 16

200 g of an isopropyl alcohol dispersion liquid of hollow silicon oxide particles (Thrulya 1110 manufactured by JGC Catalysts and Chemicals Ltd., average particle size: approximately 50 nm, shell thickness: approximately 10 nm, solid content: 20.5% by mass) was mixed with 1-propoxy-2-propanol to prepare a dispersion liquid 16 with a solid content of 3.9% by mass.

An acid was added to the dispersion liquid 16 such that the ratio of hollow silicon oxide particles:acid component was 200:1. The acid added was an acid with two acidic groups (dodecafluorosuberic acid manufactured by Tokyo Chemical Industry Co., Ltd.).

Furthermore, the silica sol 2 was added such that the mass ratio of hollow silicon oxide particles:silica sol component was 100:11. The mixture was then mixed by stirring at room temperature for 2 hours to prepare a coating liquid 16 containing hollow silicon oxide particles.

The coating liquid 16 was dropped on a glass substrate and was spread with a spin coater such that the resulting porous layer had a thickness of approximately 110 nm, and was then baked in a thermostatic oven at 140° C. for 30 minutes to prepare a member 1-16 including a porous layer 20-16 containing particles. The contact angle of pure water on the surface of the porous layer 20-16 opposite the substrate was 9 degrees.

Example 17

200 g of an isopropyl alcohol dispersion liquid of hollow silicon oxide particles (Thrulya 4110 manufactured by JGC Catalysts and Chemicals Ltd., average particle size: approximately 60 nm, shell thickness: approximately 10 nm, solid content: 20.5% by mass) was mixed with 1-propoxy-2-propanol to prepare a dispersion liquid 17 with a solid content of 3.9% by mass.

An acid was added to the dispersion liquid 17 such that the ratio of hollow silicon oxide particles:acid component was 400:1. The acid added was an acid with two acidic groups (dodecafluorosuberic acid manufactured by Tokyo Chemical Industry Co., Ltd.).

Furthermore, the silica sol 2 was added such that the mass ratio of hollow silicon oxide particles:silica sol component was 100:11. The mixture was then mixed by stirring at room temperature for 2 hours to prepare a coating liquid 17 containing hollow silicon oxide particles.

The coating liquid 17 was dropped on a glass substrate and was spread with a spin coater such that the resulting porous layer had a thickness of approximately 110 nm, and was then baked in a thermostatic oven at 140° C. for 30 minutes to prepare a member 1-17 including a porous layer 20-17 containing particles. The contact angle of pure water on the surface of the porous layer 20-17 opposite the substrate was 10 degrees.

Example 18

While 1-propoxy-2-propanol was added to 400 g of an isopropyl alcohol dispersion liquid of hollow silicon oxide particles (Thrulya 4110 manufactured by JGC Catalysts and Chemicals Ltd., average particle size: approximately 60 nm, shell thickness: approximately 10 nm, solid content: 20.5% by mass), isopropyl alcohol was evaporated by heating. The isopropyl alcohol was evaporated to a solid content of 19.5% by mass. Thus, 420 g of a 1P2P solvent-substituted liquid of hollow silicon oxide particles (hereinafter referred to as a solvent-substituted liquid 3) was prepared. An acid was added to the solvent-substituted liquid 3 such that the mass ratio of hollow silicon oxide particles:acid component was 400:1. Thus, a dispersion liquid 18 was prepared. The acid added was an acid with two acidic groups (tetrafluorosuccinic acid manufactured by Tokyo Chemical Industry Co., Ltd.).

The dispersion liquid 18 was diluted with ethyl lactate to a solid content of 3.9% by mass. The silica sol 2 was then added to the dispersion liquid 18 such that the ratio of hollow silicon oxide particles:silica sol component was 100:11. The mixture was then mixed by stirring at room temperature for 2 hours to prepare a coating liquid 18 containing hollow silicon oxide particles.

The coating liquid 18 was dropped on a glass substrate and was spread with a spin coater such that the resulting porous layer had a thickness of approximately 110 nm, and was then baked in a thermostatic oven at 140° C. for 30 minutes to prepare a member 1-18 including a porous layer 20-18 containing particles. The contact angle of pure water on the surface of the porous layer 20-18 opposite the substrate was 8 degrees.

Comparative Example 1

An acid was added to the solvent-substituted liquid 2 such that the ratio of hollow silicon oxide particles:acid component was 100:1. Thus, a dispersion liquid 19 was prepared. The acid added was 3,3,3-trifluoropropionic acid (manufactured by Tokyo Chemical Industry Co., Ltd., number of acidic groups: 1).

The dispersion liquid 19 was diluted with ethyl lactate to a solid content of 3.9% by mass. The silica sol 1 was then added to the dispersion liquid 19 such that the mass ratio of hollow silicon oxide particles:silica sol component was 100:12. The mixture was then mixed by stirring at room temperature for 2 hours to prepare a coating liquid 19 containing hydrophilic silicon oxide particles.

The coating liquid 19 was dropped on a glass substrate and was spread with a spin coater such that the resulting porous layer had a thickness of approximately 110 nm, and was then baked in a thermostatic oven at 140° C. for 30 minutes to prepare a member 1-19 including a porous layer 20-19 containing particles. The contact angle of pure water on the porous layer 20-19 was 21 degrees.

Comparative Example 2

An acid was added to the solvent-substituted liquid 1 such that the mass ratio of hollow silicon oxide particles:acid component was 100:1. Thus, a dispersion liquid 20 was prepared. The acid added was p-toluenesulfonic acid monohydrate (manufactured by Tokyo Chemical Industry Co., Ltd., number of acidic groups: 1).

The dispersion liquid 20 was diluted with ethyl lactate to a solid content of 3.9% by mass. The silica sol 2 was then added to the dispersion liquid 20 such that the mass ratio of hollow silicon oxide particles:silica sol component was 100:12. The mixture was then mixed by stirring at room temperature for 2 hours to prepare a coating liquid 20 containing hollow silicon oxide particles.

The coating liquid 20 was dropped on a glass substrate and was spread with a spin coater such that the resulting porous layer had a thickness of approximately 110 nm, and was then baked in a thermostatic oven at 140° C. for 30 minutes to prepare a member 1-20 including a porous layer 20-20 containing particles. The contact angle of pure water on the porous layer 20-20 was 13 degrees.

Comparative Example 3

Phosphoric acid (manufactured by Tokyo Chemical Industry Co., Ltd., number of acidic groups: 1) was added to the solvent-substituted liquid 1 such that the mass ratio of hollow silicon oxide particles:acid component was 100:1. Thus, a dispersion liquid 21 was prepared.

The dispersion liquid 21 was diluted with ethyl lactate to a solid content of 3.9% by mass. The silica sol 1 was then added to the dispersion liquid 21 such that the mass ratio of hollow silicon oxide particles:silica sol component was 100:12. The mixture was then mixed by stirring at room temperature for 2 hours to prepare a coating liquid 21 containing hollow silicon oxide particles.

The coating liquid 21 was dropped on a glass substrate and was spread with a spin coater such that the resulting porous layer had a thickness of approximately 110 nm, and was then baked in a thermostatic oven at 140° C. for 30 minutes to prepare a member 1-21 including a porous layer 20-21 containing particles. The contact angle of pure water on the porous layer 20-21 was 15 degrees.

Table 1 shows the evaluation results of the coating liquids 1 to 18 used in the examples and comparative examples and the members 1-1 to 1-18 produced using the coating liquids.

TABLE 1

| | | | Acid | | | | | | Evaluation results | | | |
| | | Silicon oxide particle | Number of acidic groups | Formula | Acidic group | Designation | pKa | Addition amount (phr) | Coatability | Film strength | Refractive index | Scattering |
|---|---|---|---|---|---|---|---|---|---|---|---|---|
| Example 1 | Coating liquid 1 | Hollow | 2 | (1) | —COOH | Tetrafluoro-succinic Acid | −1.03 | 0.25 | A | A | A | 20 |
| Example 2 | Coating liquid 2 | Hollow | 2 | (1) | —COOH | Octafluoro-adipic Acid | 0.23 | 0.25 | A | A | A | 22 |
| Example 3 | Coating liquid 3 | Cocoon-like | 3 | (3) | —PO$_3$H$_2$ | Nitrilotris | 0.56 | 1 | B | B | B | 25 |
| Example 4 | Coating liquid 4 | Chainlike | 4 | (4) | —PO$_3$H$_2$ | N,N,N',N'-Ethylene-diaminetetrakis | 0.13 | 0.5 | A | B | B | 25 |
| Example 5 | Coating liquid 5 | Chainlike | 2 | (2) | —SO$_3$H | 4,4'-Biphenyl-disulfonic Acid | −1.14 | 0.5 | A | A | B | 24 |
| Example 6 | Coating liquid 6 | Hollow | 2 | (1) | —COOH | Tetrafluoro-succinic Acid | −1.03 | 0.2 | A | A | A | 22 |
| Example 7 | Coating liquid 7 | Hollow | 2 | (1) | —COOH | Octafluoro-adipic Acid | 0.23 | 0.4 | A | A | A | 23 |
| Example 8 | Coating liquid 8 | Chainlike | 2 | (1) | —COOH | Tetrafluoro-succinic Acid | −1.03 | 1 | A | A | A | 19 |
| Example 9 | Coating liquid 9 | Chainlike | 2 | (1) | —COOH | Tetrafluoro-succinic Acid | −1.03 | 10 | A | A | A | 16 |
| Example 10 | Coating liquid 10 | Hollow | 2 | (1) | —COOH | Dodecafluoro-suberic Acid | 0.23 | 0.5 | A | A | A | 22 |

TABLE 1-continued

| | | Silicon oxide particle | Acid | | | | | Addition amount (phr) | Evaluation results | | | |
| | | | Number of acidic groups | Formula | Acidic group | Designation | pKa | | Coatability | Film strength | Refractive index | Scattering |
|---|---|---|---|---|---|---|---|---|---|---|---|---|
| Example 11 | Coating liquid 11 | Hollow | 2 | (1) | —COOH | Dodecafluoro-suberic Acid | 0.23 | 0.5 | A | A | A | 15 |
| Example 12 | Coating liquid 12 | Hollow | 2 | (1) | —COOH | Dodecafluoro-suberic Acid | 0.23 | 0.4 | A | A | A | 20 |
| Example 13 | Coating liquid 13 | Hollow | 2 | (1) | —COOH | Hexafluoro-glutaric Acid | 0.22 | 0.5 | A | A | A | 24 |
| Example 14 | Coating liquid 14 | Hollow | 2 | (1) | —COOH | Dodecafluoro-suberic Acid | 0.23 | 0.4 | A | A | A | 21 |
| Example 15 | Coating liquid 15 | Hollow | 2 | (1) | —COOH | Dodecafluoro-suberic Acid | 0.23 | 0.4 | B | A | A | 21 |
| Example 16 | Coating liquid 16 | Hollow | 2 | (1) | —COOH | Dodecafluoro-suberic Acid | 0.23 | 0.5 | A | A | A | 17 |
| Example 17 | Coating liquid 17 | Hollow | 2 | (1) | —COOH | Dodecafluoro-suberic Acid | 0.23 | 0.25 | A | B | A | 23 |
| Example 18 | Coating liquid 18 | Hollow | 2 | (1) | —COOH | Dodecafluoro-suberic Acid | 0.23 | 0.25 | A | A | A | 20 |
| Comparative example 1 | Coating liquid 19 | Hollow | 1 | — | —COOH | 3,3,3-Trifluoro-propionic Acid | 3.1 | 1 | B | C | B | 27 |
| Comparative example 2 | Coating liquid 20 | Hollow | 1 | — | —SO$_3$H | p-Toluene-sulfonic Acid Monohydrate | -2.8 | 1 | B | C | B | 34 |
| Comparative example 3 | Coating liquid 21 | Hollow | 1 | — | —PO$_3$H$_2$ | Phosphoric acid | 2.1 | 1 | C | C | B | 35 |

The results in Table 1 show that Examples 1 to 18 had high film strength while maintaining a low refractive index. Examples 1 to 18 also had a scattering value of 25 or less and had sufficient performance as optical functional films.

By contrast, Comparative Examples 1 to 3 had low film strength and a high scattering value of 25 or more. This probably shows that with an acid with only one acidic group it was difficult to maintain a highly dispersed state as the solvent evaporates during the formation of the coating film, thus resulting in irregular arrangement, linear scratches, and peeling. The irregular arrangement also probably resulted in a high scattering value.

As described above, the present disclosure can provide a member having a porous layer containing silicon oxide particles and having a low refractive index and high film strength, and a coating liquid for forming a porous layer containing silicon oxide particles.

Although optical members are mainly described above, a member according to the present disclosure can be used for other applications. Applications other than optical members may only require good coatability and high film strength and do not necessarily require a low refractive index or scattering value. For example, these applications include heat-insulating members and insulating members.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-161434 filed Sep. 25, 2020 and No. 2021-125004 filed Jul. 30, 2021, which are hereby incorporated by reference herein in their entirety.

What is claimed is:

1. A member having a porous layer on a substrate, wherein the porous layer contains a plurality of silicon oxide particles bound by an inorganic binder and at least one acid selected from the group consisting of the following formulae (1) to (4):

(1)

(2)

(3)

(4)

wherein $A_1$ in the formula (1) denotes COOH, and n denotes an integer in the range of 2 to 8, one of $A_2$ and $A_3$ in the formula (2) denotes SO$_3$H or PO$_3$H$_2$, and the other denotes an acidic group selected from the group consisting of SO$_3$H, PO$_3$H$_2$, COOH, and OH, and R denotes a divalent organic group having 1 to 20 carbon atoms, at least one of $A_2$, $A_3$, and $A_4$ in the formula (3) denotes SO$_3$H or PO$_3$H$_2$, and the other denotes an acidic group selected from the group consisting of SO$_3$H, PO$_3$H$_2$, COOH, and OH, and R denotes a trivalent organic group having 1 to 20 carbon atoms, and at least one of $A_2$, $A_3$, $A_4$, and $A_5$ in the formula (4) denotes SO$_3$H or PO$_3$H$_2$, and the other denotes an acidic group selected from the group consisting of SO$_3$H, PO$_3$H$_2$, COOH, and OH, and R denotes a tetravalent organic group having 1 to 20 carbon atoms.

2. The member according to claim 1, wherein the silicon oxide particles are hollow silicon oxide particles or chainlike silicon oxide particles.

3. The member according to claim 2, wherein the silicon oxide particles are hollow silicon oxide particles, and the hollow silicon oxide particles have an average particle size in the range of 15 to 300 nm.

4. The member according to claim 2, wherein the silicon oxide particles are chainlike silicon oxide particles, and primary particles constituting the chainlike silicon oxide particles have a short diameter in the range of 8 to 20 nm and a long diameter in the range of 1.5 to 3.0 times the short diameter.

5. The member according to claim 1, wherein the inorganic binder is a silicon oxide compound.

6. The member according to claim 1, wherein the porous layer has a refractive index in the range of 1.20 to 1.30.

7. The member according to claim 1, wherein pure water on a surface of the porous layer opposite the substrate has a contact angle in the range of 3 to 20 degrees.

8. The member according to claim 1, further comprising an intermediate layer between the substrate and the porous layer.

9. The member according to claim 8, wherein the intermediate layer includes an inorganic compound layer or a polymer layer.

10. The member according to claim 8, wherein the intermediate layer includes a high-refractive-index layer with a relatively high refractive index and a low-refractive-index layer with a relatively low refractive index alternately stacked.

11. The member according to claim 1, further comprising a functional layer on a surface of the porous layer opposite the substrate.

12. The member according to claim 11, wherein the functional layer is an antifouling layer, and the antifouling layer is one of a fluoropolymer-containing layer, a fluorosilane monolayer, and a layer containing titanium oxide particles.

13. The member according to claim 11, wherein the functional layer is a hydrophilic layer, and the hydrophilic layer is a layer containing a polymer with a zwitterionic hydrophilic group.

14. An optical apparatus comprising:
a housing; and
an optical system composed of a plurality of lenses in the housing, wherein
the lenses are the members according to claim 1.

15. An imaging apparatus comprising:
a housing;
an optical system composed of a plurality of lenses in the housing; and
an imaging device for receiving light passing through the optical system, wherein
the lenses are the members according to claim 1.

16. A lens filter comprising:
a frame; and
a filter member supported by the frame, wherein
the filter member is the member according to claim 1.

17. A shield comprising:
a light-transmitting member; and
a holder for holding the light-transmitting member, wherein
the holder has a structure for fixing the light-transmitting member to a user such that the light-transmitting member covers at least part of user's face, and the light-transmitting member is the member according to claim 1.

18. A coating liquid comprising:
silicon oxide particles;
an organic solvent; and
at least one acid selected from the group consisting of the following formulae (1) to (4):

wherein
$A_1$ in the formula (1) denotes COOH, and n denotes an integer in the range of 2 to 8,
one of $A_2$ and $A_3$ in the formula (2) denotes $SO_3H$ or $PO_3H_2$, and the other denotes an acidic group selected from the group consisting of $SO_3H$, $PO_3H_2$, COOH, and OH, and R denotes a divalent organic group having 1 to 20 carbon atoms,
at least one of $A_2$, $A_3$, and $A_4$ in the formula (3) denotes $SO_3H$ or $PO_3H_2$, and the other denotes an acidic group selected from the group consisting of $SO_3H$, $PO_3H_2$, COOH, and OH, and R denotes a trivalent organic group having 1 to 20 carbon atoms, and
at least one of $A_2$, $A_3$, $A_4$, and $A_5$ in the formula (4) denotes $SO_3H$ or $PO_3H_2$, and the other denotes an acidic group selected from the group consisting of $SO_3H$, $PO_3H_2$, COOH, and OH, and R denotes a tetravalent organic group having 1 to 20 carbon atoms.

19. The coating liquid according to claim 18, wherein the coating liquid contains a component serving as an inorganic binder.

20. The coating liquid according to claim 18, wherein the acid content ranges from 0.05% to 10% by mass of the silicon oxide particles.

21. The coating liquid according to claim 20, wherein the acid content ranges from 0.1% to 2.0% by mass of the silicon oxide particles.

22. The coating liquid according to claim 18, wherein the acid has an acid dissociation constant in the range of −1.2 to 2 pKa.

23. The coating liquid according to claim 22, wherein the acid has an acid dissociation constant in the range of −1.2 to 0.3 pKa.

24. The coating liquid according to claim 18, wherein the silicon oxide particles are silicon oxide particles formed by a wet process.

25. The coating liquid according to claim 18, wherein the silicon oxide particles are hollow particles or chainlike particles.

26. The coating liquid according to claim 25, wherein the silicon oxide particles are hollow particles, and the hollow particles have an average particle size in the range of 15 to 300 nm.

27. The coating liquid according to claim 26, wherein the silicon oxide particles are chainlike particles, and the chainlike particles have an average short diameter in the range of 8 to 20 nm and a long diameter in the range of 4 to 8 times the short diameter.

28. The coating liquid according to claim 27, wherein the primary particles constituting chainlike silicon oxide particles are particles with a short diameter in the range of 8 to 20 nm and with a long diameter in the range of 1.5 to 3.0 times the short diameter.

29. The coating liquid according to claim 18, wherein the component serving as an inorganic binder is a silicon oxide oligomer.

30. The coating liquid according to claim 18, wherein the component serving as an inorganic binder constitutes 0.2% to 20% by mass of the silicon oxide particles.

31. The coating liquid according to claim 18, wherein 30% or more by mass of the solvent is a water-soluble solvent having 4 to 6 carbon atoms and a hydroxy group.

32. The coating liquid according to claim 31, wherein the solvent contains at least one solvent selected from the group consisting of ethoxyethanol, propoxyethanol, isopropoxyethanol, butoxyethanol, 1-methoxy-2-propanol, 1-ethoxy-2-propanol, 1-propoxy-2-propanol, ethyl lactate, and 3-methoxy-1-butanol.

33. A method for manufacturing a member, comprising the steps of:
  applying a coating liquid to a substrate; and
  drying and/or baking the substrate to which the coating liquid has been applied,
  wherein the coating liquid is the coating liquid according to claim 18.

34. The method for manufacturing a member according to claim 33, wherein the coating liquid is applied by a spin coating method in the step of applying a coating liquid to a substrate.

* * * * *